United States Patent [19]
Danne et al.

[11] Patent Number: 6,157,620
[45] Date of Patent: *Dec. 5, 2000

[54] ENHANCED RADIO TELEPHONE FOR USE IN INTERNET TELEPHONY

[75] Inventors: Anders Danne; John-Olof Bauner, both of Kista, Sweden

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/857,543

[22] Filed: May 16, 1997

[51] Int. Cl.[7] .................................................... H04L 5/14

[52] U.S. Cl. .......................................... 370/294; 379/130

[58] Field of Search ..................................... 370/260, 356, 370/365, 264, 355, 289, 352; 379/130, 88.17, 202, 357, 158, 396

[56] References Cited

U.S. PATENT DOCUMENTS

| | | | |
|---|---|---|---|
| 5,367,563 | 11/1994 | Sainton | ........................................ 379/98 |
| 5,553,063 | 9/1996 | Dickson . | |
| 5,608,786 | 3/1997 | Gordon . | |
| 5,633,920 | 5/1997 | Kikinis et al. | ........................... 379/130 |

FOREIGN PATENT DOCUMENTS

| | | |
|---|---|---|
| 2174073 | 4/1996 | Canada . |
| 0738060A | 10/1996 | European Pat. Off. . |
| 0748139A | 12/1996 | European Pat. Off. . |
| WO89/11195 | 11/1989 | WIPO . |
| WO9818238 | 4/1998 | WIPO . |

OTHER PUBLICATIONS

S. Hattori et al., "Integrated Digital Switching System with Queuing Storage Facility," *IEEE International Conference on Communications*, pp. 27.4.–1–5, Jun. 1980.

R. Cardwell, "Experiments with New Telecommunications Service Capabilities," The International Symposium on Subscriber Loops and Services, pp. 187–191, Sep. 1980.

"Business Communication Users Can Get Best of Both Worlds," *Telephony*, pp. 34, 38, Oct. 1981.

*IBM Technical Disclosure Bulletin*, vol. 21, No. 6, pp. 2546–1547, Nov. 1978.

(List continued on next page.)

*Primary Examiner*—Valencia Martin-Wallace
*Assistant Examiner*—Kim T. Nguyen
*Attorney, Agent, or Firm*—Burns, Doane, Swecker & Mathis, L.L.P.

[57] ABSTRACT

An enhanced radio telephone providing both wireless communication and Internet-protocol (IP) telephone communication. In addition to transmitting and receiving digitized and coded speech signals in a wireless fashion using a radio transceiver, the enhanced radio telephone can also exchange coded speech data with a computer which is coupled to a communication network. Thus, the enhanced radio telephone can selectively operate as either a conventional radio telephone or as an improved IP telephone. The enhanced radio telephone includes an internal speech coder which is implemented for low power consumption and which allows the enhanced radio telephone to be used with a relatively low-cost computer for effective and economic IP telephony.

In exemplary embodiments, an enhanced radio handset is connected to an input/output port of a personal computer running a software telephony application. Coded and compressed digital speech signals are passed back and forth between the enhanced radio telephone and the computer, and the computer performs conversions between the coded speech signals and an appropriate network protocol. Because the computer does not perform speech coding and decoding internally, the computer functionality may be implemented, for example, using an inexpensive notebook or palm-top computer. Advantageously, a user may initiate telephone calls from either the enhanced radio telephone or the telephony application running on the computer.

39 Claims, 4 Drawing Sheets

OTHER PUBLICATIONS

C. Sederholm et al., "Intelligent Telephone," *IBM Technical Disclosure Bulletin,* pp. 4006–4008, Feb. 1981.
R. Adkins et al., "Displayphone: Telephone and Terminal Combine in a Compact Desk–Top Unit," *Telesis,* Bell–Northern Research, Ltd. (Canada). pp. 2–7, 1982.
J. Powers, "Putting Your PC on the Line," *PC World,* vol. 1, No. 6, pp. 142–149 Sep. 1983.
D. Andersen et al., "Digital Subset for the ITT 5300 Business Communication System," *Electrical Communication,* vol. 58, No. 2, pp. 200–205, 103, 1983.
A. Torino, "LAN's—Partners with Voice/Data Systems," *Telecommunications,* pertinent pages, Sep. 1984.
"Telephone Video System Attachment," *IBM Technical Disclosure Bulletin,* vol. 28, No. 11, pp. 4729–4732, Apr. 1986.
T. Saito et al., "Local Digital Telephone System on Two–Way Cable Television," *Elsevier Science Publishers B.V.* (North–Holland), pp. 11–25, 1986.
"A New Generation of Information Terminals," pertinent pages, Apr. 1987.
D. Pfeiffer, "International Videotex Information Exchange with Multistandard System VTX2000," *Telecom Report 10,* No. 5, Sep./Oct. 1987.
*Cygnet Communications CoSystem,* pertinent pages, 6/88.
G. Borton, "Integrating Voice and Data: A New Approach," *ISDN 88: Online Publications,* pp. 155–162, 1988.
"CBX Software Process for Direct Incoming Data Calls," *IBM Technical Disclosure Bulletin,* vol. 31, No. 10, pp. 320–321, Mar. 1989.
"There's Only One PC/XT Modem Designed to Let Both You and Your Computer Talk," pertinent pages, 1983.
"Inexpensive Multimedia Facility for Workstation," *IBM Technical Bulletin,* vol.. 38, No. 08, pp. 415–417, Aug. 1995.
D. Hughes, "What Hath (Net) God Wrought?," *The Journal,* Fairfax, Va, pertinent pages, Tuesday, Feb. 21, 1995.
TELECOMPQ document, *Telecommunications,* p. 103, Jun. 1985.
M. Mills, "Phone Service Via the Internet May Slash Rates," *The Washington Post,* pertinent pages, Sunday, Aug. 11, 1996.

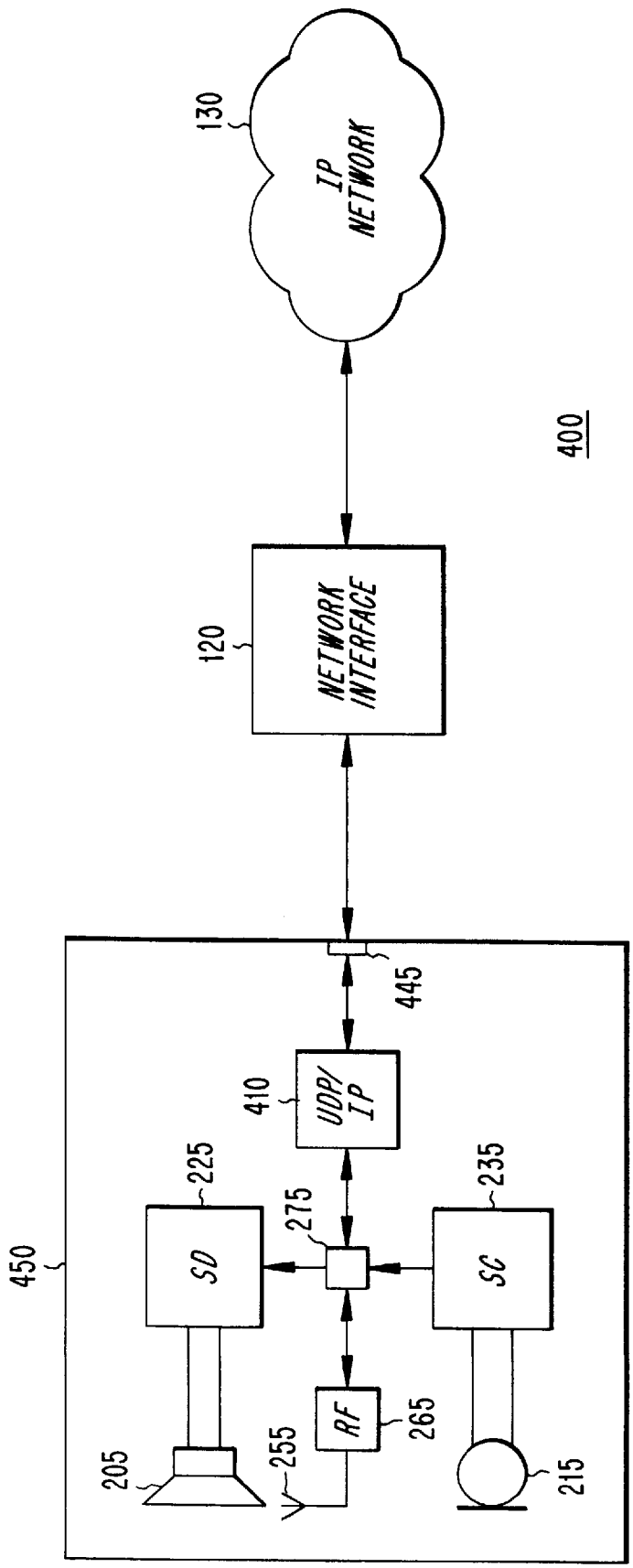

ENHANCED RADIO TELEPHONE FOR USE IN INTERNET TELEPHONY

BACKGROUND OF THE INVENTION

The present invention relates to Internet telephony, and more particularly to an improved end-user interface for Internet-protocol (IP) telephone communication.

Today, Internet telephony is an emerging competitor to conventional telephony as long distance calls are carried over the global Internet at relatively low cost. Additionally, although present Internet telephony systems provide comparably poor quality of service, future improvements will undoubtedly provide signal quality at least on the order of that provided by conventional systems.

Available IP telephones consist primarily of a multimedia personal computer (PC) running a software telephony application which translates end-user sound signals into appropriately formatted digital signals for transfer over a computer network (e.g., the global Internet), and vice versa. Typically, such a multimedia PC includes a sound card with a microphone and a speaker for speech input and output, and accesses the computer network through an appropriate network interface, such as a public switched telephone network (PSTN), a wireless network, or a public or private data network. The software telephony application compresses and decompresses end-user speech signals in order to decrease bandwidth requirements for computer network transmissions. Thus, speech coding and decoding is typically carried out by a central processing unit (CPU) in the multimedia PC. The precise type of speech coding used (e.g., GSM, D-AMPS, etc.) depends upon the bit-rate and speech quality requirements for a given application. Compressed sound signals are transmitted over the computer network using an appropriate UDP/IP network protocol, as is well known in the art. As with speech coding and decoding, the computer network protocol is conventionally administered by the software telephony application running on the multimedia PC.

Despite the above described benefits, the IP telephone of today has several disadvantages as compared to a conventional telephone. For example, common speech coding and decoding algorithms require high performance PCs including relatively fast CPUs. Additionally, the conventional IP-telephone application requires extra sound equipment, such as a sound card and microphone, which is not often included in a standard consumer PC package.

Thus, the conventional IP telephone consists of a relatively high-end PC which is high-priced, power-hungry, and over-sized as compared to a conventional telephone. Additionally, the PC is normally switched off and requires a relatively long and inconvenient boot-up time. Furthermore, even a fully equipped PC does not normally include a comfortable end-user telephone handset, and the relative distance between the PC microphone and PC speaker can cause disturbing echoes for system users. Thus, there is a real need for an improved IP telephone.

SUMMARY OF THE INVENTION

The present invention fulfills the above described and other needs by providing an enhanced radio telephone which can be connected to a PC and used as a significantly improved IP telephone. By way of contrast to an ordinary radio telephone in which a speech coder digital interface is connected exclusively to radio circuitry for wireless communication (e.g., via a cellular radio system), the enhanced radio telephone can transmit and receive digitized and coded speech signals via an alternate external connection as well. Thus, the enhanced radio telephone can selectively operate as either a conventional radio telephone or as an improved IP telephone.

Advantageously, the enhanced radio telephone includes an internal speech coder which is implemented for low power consumption and which allows the enhanced radio telephone to be used with a relatively low-performance PC for effective IP telephony. The enhanced radio telephone thereby provides a low cost IP telephone solution in which speech delay is reduced as compared to conventional IP telephone systems. Additionally, the enhanced radio telephone handset is convenient for speech conversation and reduces the above described echo problems which are commonly associated with conventional IP telephones.

In exemplary embodiments, the enhanced radio handset is connected via a cable to a serial or parallel port of a PC running a streamlined software telephony application. In alternative embodiments, a wireless infrared (IR) or short range radio connection is used for communication between the enhanced radio telephone and the PC. Coded and compressed digital speech signals are passed back and forth between the enhanced radio telephone and the PC, and the PC performs conversions between the coded speech signals and an appropriate computer network protocol. Because the PC need not perform speech coding and decoding, the PC may be implemented, for example, as a low-end desk-top computer, a lap-top/notebook computer, or even a palm-top computer.

Advantageously, a standard PC serial or parallel port connection is sufficient to carry digital speech and control signalling in both directions between the enhanced radio telephone and the PC. According to the invention, IP-telephone control is initiated from either the PC or the enhanced radio telephone. Additionally, the enhanced radio telephone is switched between ordinary wireless (e.g., cellular) operation and IP-telephone operation either manually (e.g., via a pushbutton on the radio handset) or automatically from the PC (e.g., via an option in the telephony application running on the PC). Furthermore, a call can be initiated using either the PC software telephony application or a keypad on the enhanced radio telephone.

In alternative embodiments, the enhanced radio telephone is also used for wireless data communication in order to carry IP speech. In other words, coded speech is passed from the enhanced radio telephone to the PC where it is formatted according to an appropriate UDP/IP network protocol, and the resulting IP speech is passed back to the enhanced radio telephone for transmission to a computer network via a wireless network interface. In such an exemplary embodiment, IP data transfer is conducted using either a separate connection on the enhanced radio telephone or the same connection which is used to carry coded speech and control signalling. Advantageously, a PC serial port is sufficient to carry digital speech, control signalling and IP data.

In brief, the present invention provides an improved IP telephone which is more convenient, economical and efficient as compared to conventional IP telephony systems. These and additional features of the present invention are explained in greater detail hereinafter with reference to the illustrative examples which are shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

FIGS. 3 and 4 are block diagrams of alternative IP telephony systems constructed in accordance with the teachings of the present invention.

DETAILED DESCRIPTION OF THE INVENTION

Figure 1:
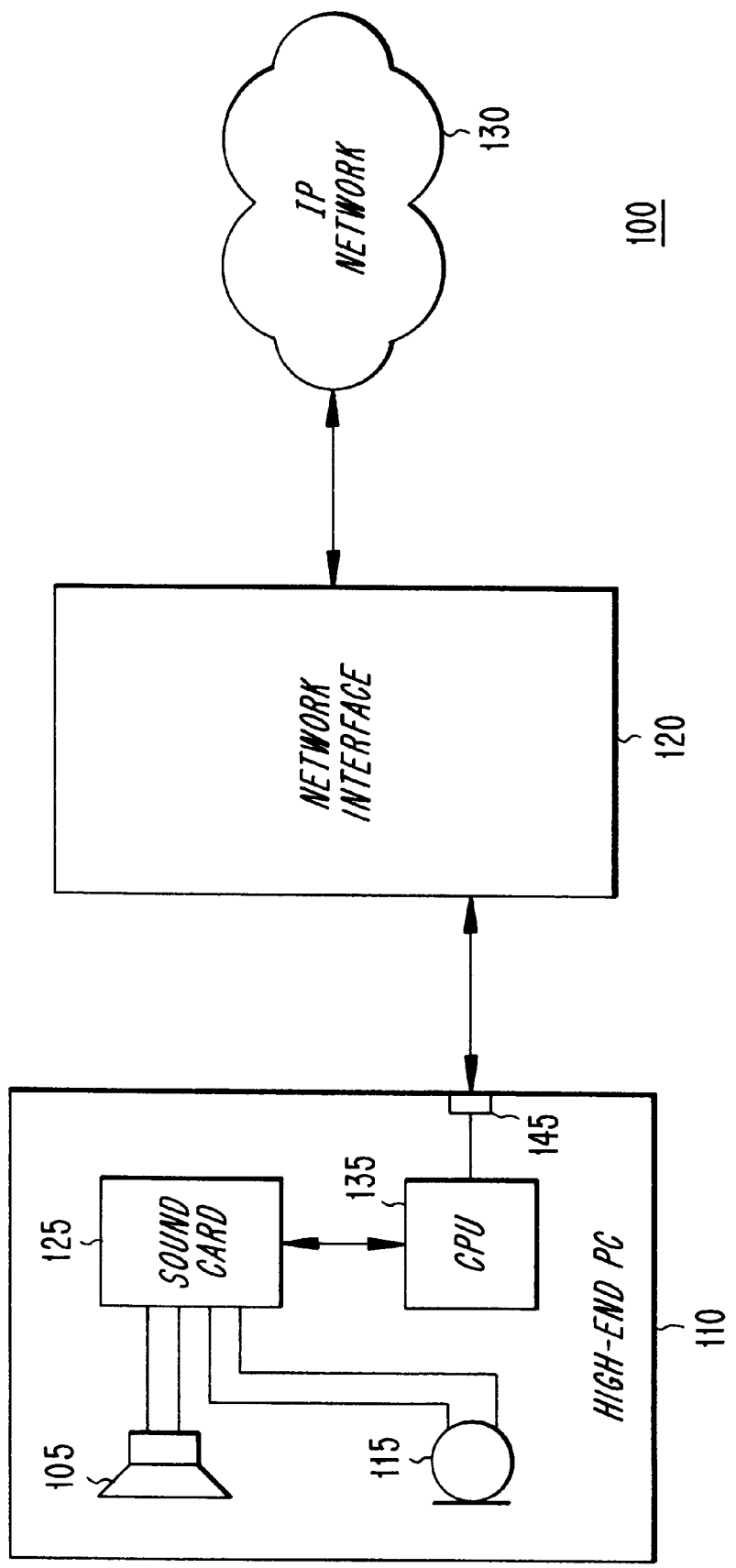
FIG. 1 is a block diagram of a prior art IP telephony system.

FIG. 1 depicts a prior art IP telephony system 100. As shown, the conventional system 100 includes a high-performance PC 110 and a network interface 120. The high-performance PC 110 includes a speaker 105, a sound card 125, a microphone 115, a CPU 135, and an input/output port 145. In the figure, an output of the microphone 115 is coupled to an input of the sound card 125, and an output of the sound card 125 is coupled to an input of the speaker 105. An input/output port of the sound card 125 is coupled to a first input/output port of the CPU 135, and a second input/output port of the CPU 135 is coupled to the PC input/output port 145. The PC input/output port 145 is in turn coupled to a first input/output port of the network interface 120, and a second input/output port of the network interface 120 is coupled to a network 130. The network 130 may be, for example, the global Internet or an Intranet operated by a public or private organization. Thus, the term "IP" will be understood to encompass both Internet-protocol and Intranet-protocol systems.

In operation, a near-end user of the PC 110 initiates an IP telephone call, for example by activating a software telephony application on the PC 110. During conversation, the near-end user speaks into the microphone 115, and the audio signal received by the microphone 115 is digitized within the sound card 125. The digitized signal which is output by the sound card 125 is passed to the CPU 135. The CPU 135, which is running the telephony application, compresses and codes the digitized speech using an appropriate speech coding algorithm (e.g., GSM, D-AMPS, etc.) and converts the coded speech, using an appropriate UDP/IP network protocol, into a format which is appropriate for transmission via the network 130. The resulting IP data is transmitted by the CPU 135 via the PC input/output port 145 to the network interface 120, where it is routed to the network 130 and passed on to a far-end user.

Conversely, IP speech signals generated by the far-end user are received from the network 130 at the network interface 120 and passed to the PC 110 via the PC input/output port 145. The CPU 135 receives the IP-formatted far-end data and converts it to corresponding coded far-end speech signals. The coded far-end speech signals are decoded by the CPU 135 using an appropriate algorithm to produce digital sound data which is passed to the sound card 125. The sound card 125 converts the digital far-end sound data into a corresponding analog signal which is directed to the speaker 105 for presentation to the near-end user.

As is well known in the art, the network interface 120 may connect to any one of a number of available systems in order to access the network 130. For example, the network interface 120 may connect to a public switched telephone network (PSTN), a wireless radio system, or a public or private data network as appropriate. Accordingly, the link between the PC 110 and the network interface 120 can utilize any appropriate digital protocol, depending upon the particular type of link used in a given application. When the link is an analog PSTN, the network interface 120 converts digital coded information received from the PC 110 into analog signals suitable for transmission over conventional telephone lines using a conventional modem. When the link is a digital telephone network, the network interface 120 converts digital information received from the PC 110 into a digital protocol associated with the telephone network (e.g., ISDN). When the link is a wireless radio system, the network interface 120 includes a suitable transceiver for modulating and demodulating signals transmitted to, and received from, the network interface 120, respectively. When the link is a public or private data network, the network interface 120 converts digital coded information received from the PC 110 into a format which is appropriate for the public or private network. Advantageously, the network interface 120 can be integrated into the PC 110 or even the CPU 135.

Though the system of FIG. 1 is sufficient for certain applications, it suffers from several significant disadvantages as described above. For instance, advanced speech coding and decoding algorithms, necessary for reduced delay and signal quality, require that the CPU 135 be relatively fast. Additionally, the sound card 125 and the microphone 115 are accessories not typically included in a standard consumer PC package. Furthermore, the relatively complex software telephony application, which must perform both speech coding/decoding and UDP/IP conversion, may be prohibitively expensive and require significant computer memory. Advantageously, the present invention teaches that a radio telephone, ordinarily used exclusively for wireless radio (e.g., cellular) communication, can be enhanced to work in conjunction with a PC-based telephony application so that computationally intensive speech coding and decoding can be performed external to the PC and so that an effective IP telephone can be constructed economically without requiring a high-end computer.

Figure 2:
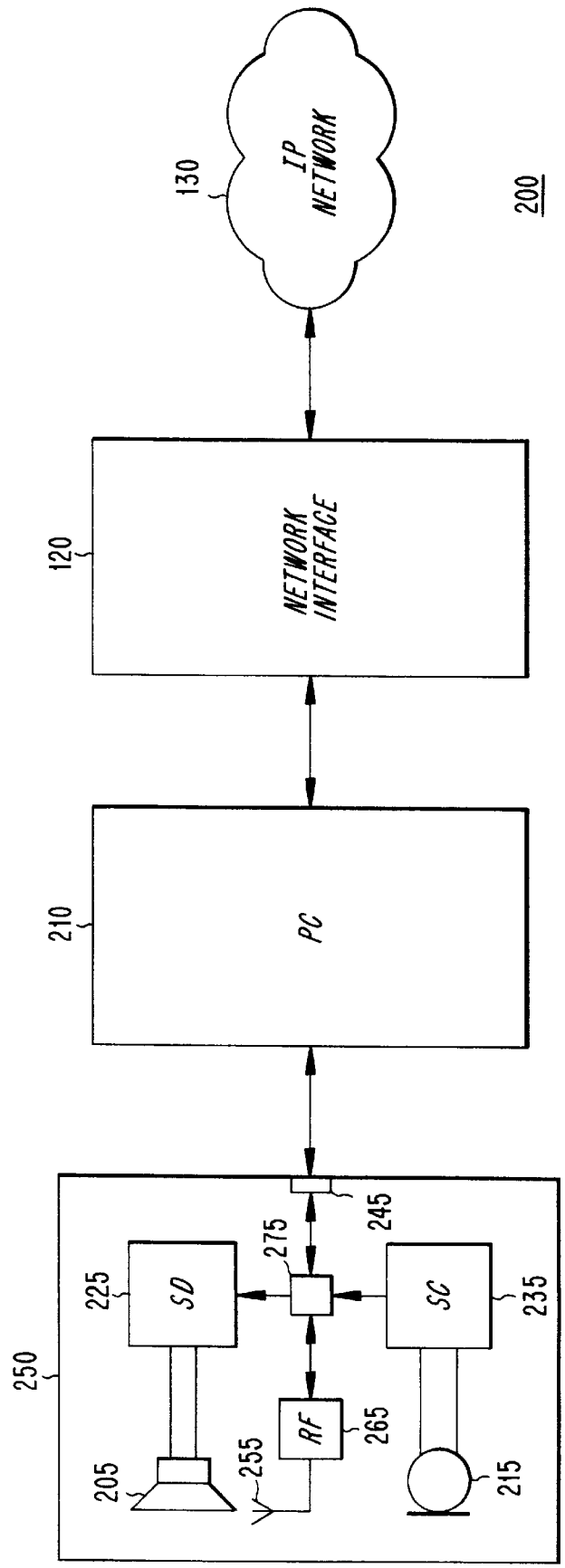
FIG. 2 is a block diagram of an IP telephony system constructed in accordance with the teachings of the present invention.

FIG. 2 is a conceptual diagram of an IP telephony system 200 constructed in accordance with the teachings of the present invention. As shown, the improved IP telephony system 200 includes an enhanced wireless telephone 250, a PC 210 and a network interface 120. The enhanced wireless telephone 250 includes a speaker 205 (e.g., an earphone in a wireless handset), a speech decompressor 225, an antenna 255, a radio frequency transceiver 265, a digital interface 275, an external connection 245, a speech compressor 235 and a microphone 215 (e.g., within a mouthpiece in a wireless handset).

As shown, an output of the microphone 215 is coupled to an input of the speech compressor 235, and an output of the speech compressor 235 is coupled to an input of the digital interface 275. Additionally, an output of the digital interface 275 is coupled to an input of the speech decompressor 225, and an output of the speech decompressor 225 is coupled to an input of the speaker 205. The antenna 255 is bi-directionally coupled to the RF transceiver 265 which is in turn bi-directionally coupled to a first input/output port of the digital interface 275. A second input/output port of the digital interface 275 is coupled to the external connection 245, and the external connection 245 is in turn coupled to a first input/output port of the PC 210. A second input/output port of the PC 210 is coupled to a first input/output port of the network interface 120, and a second input/output port of the network interface 120 is coupled to a network 130 such as the global Internet or an Intranet.

In a first, wireless-telephone mode of operation, the digital interface 275 directs output from the speech coder 235 to the radio frequency transceiver 265, and directs output from the radio frequency transceiver 265 to the speech decoder 225, so that the enhanced radio telephone 250 operates as a conventional wireless telephone. In other words, speech signals from the near-end user received at the microphone 215 are compressed and coded by the speech coder 235 and transmitted by the radio frequency transceiver 265 to a wireless (e.g., cellular) system via the antenna 255. Conversely, far-end radio signals received from the wireless system by the radio frequency transceiver 265 are decoded by the speech decoder 225 and presented to the near-end user via the speaker 205.

In a second, IP-telephone mode of operation, the digital interface 275 directs output from the speech coder 235 to the external connection 245, and directs output from the external connection 245 to the speech decoder 225, so that the enhanced radio telephone 250 operates in conjunction with the PC 210 as an improved IP telephone. In other words, coded speech signals are passed from the speech coder 235 to the PC 210 where they are formatted by a software telephony application using an appropriate UDP/IP network protocol. The network-formatted signals are transmitted by the PC 210 to the network 130 via the network interface 120 as described above with reference to FIG. 1. Conversely, network-formatted far-end signals received at the PC 210 via the network interface 120 are converted by the PC telephony application into corresponding coded far-end speech signals. The coded far-end speech signals are passed to the speech decoder 225 where they are decoded and presented to the near-end user via the speaker 205. As above, the network interface 120 may connect to any one of a number of available network links, including a PSTN, a wireless radio system, or a public or private data network. Advantageously, the network interface 120 can be integrated within the PC 210.

The speech coder 235 and the speech decoder 225, respectively, code and decode speech during IP-telephone operation using the same algorithms (e.g., GSM, D-AMPS, etc.) used during radio-telephone operation. Advantageously, the speech coder 235 and the speech decoder 225 are constructed in accordance with the radio telephone art to operate at high speed using relatively little power. Because the burden of speech coding and decoding is removed from the telephony application running on the PC 210, the telephony application can be streamlined, and the CPU within the PC 210 need not be nearly as fast as that of the PC 110 of the system of FIG. 1. Additionally, the PC 210 need not include a sound card, a microphone, or a speaker. As a result, the PC 210 can be implemented using a relatively inexpensive, relatively low-performance computer. Additionally, the enhanced radio telephone 250 provides a convenient and comfortable handset for the near-end user and significantly reduces the echo problem associated with conventional IP telephones. For example, because the near-end user holds the handset to his or her ear, the echo path between the microphone and the speaker is largely blocked. Furthermore, the enhanced radio telephone 250 can provide echo canceling circuitry as is well known in the radio telephone art.

In the embodiment of FIG. 2, coupling between the external connection 245 and the PC 210 is implemented using a standard serial or parallel PC cable connection. Alternatively, the connection can be established using well known IR or shortwave radio techniques. Coded speech and control information is exchanged between the enhanced radio telephone 250 and the PC 210 using handshaking techniques which are well known in the art. The enhanced radio telephone 250 and the PC 210 are programmed so that IP-telephone operation can be controlled from either the PC 210 or the enhanced radio telephone 250. Switching between IP-telephone operation and wireless-telephone operation can be initiated manually using a keypad on the enhanced radio telephone 250 or automatically via the telephony application running on the PC 210. Additionally, a user of the enhanced radio telephone 250 can initiate a call using either the enhanced radio telephone keypad or the telephony application on the PC. Thus, the embodiment of FIG. 2 provides an improved IP telephone which is more convenient, economical and efficient than conventional IP telephones.

Figure 3:
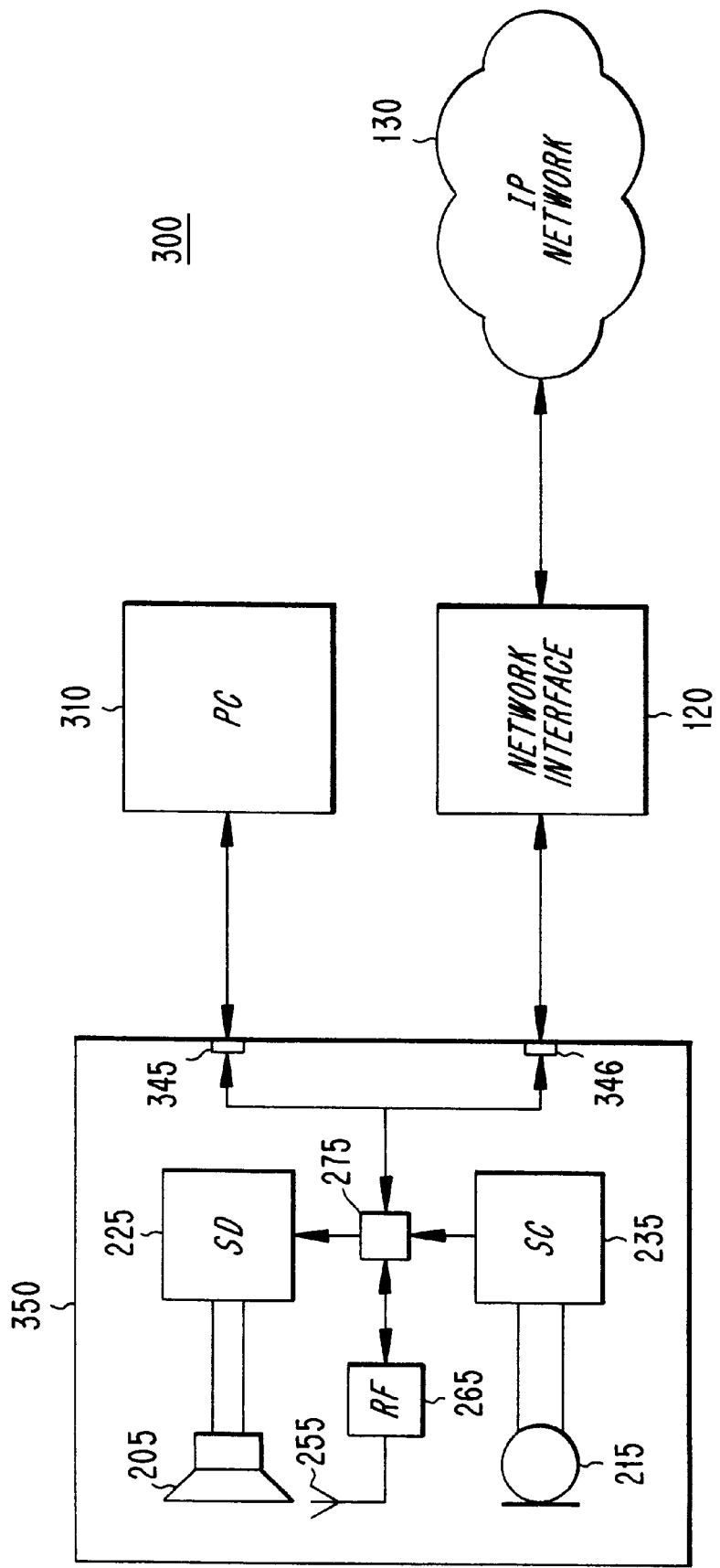

FIG. 3 is a conceptual diagram of an alternative IP telephony system 300 constructed in accordance with the teachings of the present invention. As shown, the IP telephony system 300 includes an enhanced wireless telephone 350, a PC 310 and a network interface 120. The enhanced wireless telephone 350 includes a speaker 205, a speech decompressor 225, an antenna 255, a radio frequency transceiver 265, a digital interface 275, first and second external connections 345, 346, a speech compressor 235 and a microphone 215.

As shown, an output of the microphone 215 is coupled to an input of the speech compressor 235, and an output of the speech compressor 235 is coupled to an input of the digital interface 275. Additionally, an output of the digital interface 275 is coupled to an input of the speech decompressor 225, and an output of the speech decompressor 225 is coupled to an input of the speaker 205. The antenna 255 is bi-directionally coupled to the RF transceiver 265 which is in turn bi-directionally coupled to a first input/output port of the digital interface 275. A second input/output port of the digital interface 275 is coupled to each of the external connections 345, 346. The first external connection 345 is coupled to an input/output port of the PC 310, and the second external connection 346 is coupled to a first input/output port of the network interface 120. A second input/output port of the network interface 120 is coupled to a network 130 such as the global Internet or an Intranet.

In general, operation of the exemplary embodiment of FIG. 3 is similar to that of FIG. 2. For example, in a first, wireless-telephone mode of operation, the digital interface 275 directs output from the speech coder 235 to the radio frequency transceiver 265, and directs output from the radio frequency transceiver 265 to the speech decoder 225, so that the enhanced radio telephone 250 operates as a conventional wireless telephone. However, during an IP-telephone mode of operation, the PC 310 is used to convert between coded speech data and network-formatted data, and the enhanced radio telephone 350 is used to exchange network-formatted data with the network 130 via the network interface 120.

During IP-telephone operation, coded speech signals are passed from the speech coder 235 to the PC 310 where they are formatted by a software telephony application using an appropriate UDP/IP network protocol. Thereafter, the network-formatted signals are directed back from the PC 310 to the enhanced radio telephone 350 and transmitted to the network 130 via the network interface 120. Conversely, network-formatted far-end signals received at the enhanced radio telephone 350 via the network interface 120 are passed to the PC 310 and converted by the telephony application into corresponding coded far-end speech signals. The coded far-end speech signals are passed back to the enhanced radio telephone 350 and then to the speech decoder 225 where they are decoded and presented to the near-end user via the speaker 205.

As described above with respect to FIGS. 1 and 2, the network interface 120 may connect to any one of a number of available network links, including a PSTN, a wireless radio system, or a public or private data network. Advantageously, the network interface 120 may be integrated within the enhanced radio telephone 350. When the link is a PSTN, the network interface 120 may comprise a modem or an ISDN line. When the link is a public or private data network, the network interface 120 comprises an appropriate digital connection (e.g., an Ethernet connection). When the link is a wireless radio system, the network interface 120 comprises a suitable transceiver for modulating and demodulating network-formatted signals as necessary. Advantageously, the RF transceiver 265 can be adapted to provide appropriate wireless communication during both the wireless-telephone mode of operation and the IP-telephone mode of operation. In other words, the operating frequencies of the RF transceiver 265 can be tuned as necessary to communicate with different systems.

The embodiment of FIG. 3 provides advantages similar to those described above with respect to the embodiment of FIG. 2. Additionally, because the task of communicating with the network 130 is shifted to the enhanced radio telephone 350, the PC 310 (and the telephony application running on the PC 310) can be streamlined still further. Thus, like the embodiment of FIG. 2, the exemplary embodiment of FIG. 3 provides an improved IP telephone which is more convenient, economical and efficient than conventional IP telephones.

FIG. 4 is a conceptual diagram of another alternative IP telephony system 400 constructed in accordance with the teachings of the present invention. As shown, the IP telephony system 400 includes an enhanced wireless telephone 450 and a network interface 120. The enhanced wireless telephone 450 includes a speaker 205, a speech decompressor 225, an antenna 255, a radio frequency transceiver 265, a digital interface 275, a network converter 410, an external connection 445, a speech compressor 235 and a microphone 215.

As shown, an output of the microphone 215 is coupled to an input of the speech compressor 235, and an output of the speech compressor 235 is coupled to an input of the digital interface 275. Additionally, an output of the digital interface 275 is coupled to an input of the speech decompressor 225, and an output of the speech decompressor 225 is coupled to an input of the speaker 205. The antenna 255 is bi-directionally coupled to the RF transceiver 265 which is in turn bi-directionally coupled to a first input/output port of the digital interface 275. A second input/output port of the digital interface 275 is coupled to a first input/output port of the network converter 410, and a second input/output port of the network converter 410 is coupled to the external connection 445. Additionally, the external connection 445 is coupled to a first input/output port of the network interface 120, and a second input/output port of the network interface 120 is coupled to a network 130 such as the global Internet or an Intranet.

In general, operation of the exemplary embodiment of FIG. 4 is similar to operation of the embodiments of FIGS. 2 and 3. For example, in a first, wireless-telephone mode of operation, the digital interface 275 directs output from the speech coder 235 to the radio frequency transceiver 265, and directs output from the radio frequency transceiver 265 to the speech decoder 225, so that the enhanced radio telephone 450 operates as a conventional wireless telephone. However, during an IP-telephone mode of operation, the internal network converter 410 converts between coded speech data and network-formatted data, and therefore an external PC is not necessary.

During IP-telephone operation, coded speech signals are passed from the speech coder 235 to the network converter 410 where they are formatted using an appropriate UDP/IP network protocol. Thereafter, the network-formatted signals are directed to the network 130 via the network interface 120. Conversely, network-formatted far-end signals received at the enhanced radio telephone 350 via the network interface 120 are converted by network converter 410 into corresponding coded far-end speech signals. The coded far-end speech signals are passed through the digital interface 275 to the speech decoder 225 where they are decoded and presented to the near-end user via the speaker 205.

As described above with respect to FIGS. 1–3, the network interface 120 may connect to any one of a number of available network links, including a PSTN, a wireless radio system, or a public or private data network. Advantageously, the network interface 120 may be integrated within the enhanced radio telephone 350. When the link is a PSTN, the network interface 120 may comprise a modem or an ISDN line. When the link is a public or private data network, the network interface 120 comprises an appropriate digital connection (e.g., an Ethernet connection). When the link is a wireless radio system, the network interface 120 comprises a suitable transceiver for modulating and demodulating network-formatted signals as necessary. As above, the RF transceiver 265 can be adapted to provide appropriate wireless communication during both the wireless-telephone mode of operation and the IP-telephone mode of operation. In other words, the operating frequencies of the RF transceiver 265 can be tuned as necessary to communicate with different systems.

The embodiment of FIG. 4 provides advantages similar to those described above with respect to the embodiments of FIGS. 2 and 3. Additionally, because the task of converting between IP signals and coded speech signals is integrated into the enhanced radio telephone 450, the need for an external PC is eliminated. Thus, like the embodiments of FIGS. 2 and 3, the exemplary embodiment of FIG. 4 provides an improved IP telephone which is more convenient, economical and efficient than conventional IP telephones. In practice, any one of the embodiments of FIGS. 2–4 can be utilized to advantage, depending upon the cost and performance requirements of a given application.

Those skilled in the art will appreciate that the present invention is not limited to the specific exemplary embodiments which have been described herein for purposes of illustration. The scope of the invention, therefore, is defined by the claims which are appended hereto, rather than the foregoing description, and all equivalents which are consistent with the meaning of the claims are intended to be embraced therein.

What is claimed is:

1. A radio telephone, comprising:

a microphone for receiving near-end sound and for providing corresponding near-end audio signals;

a speech coder coupled to said microphone for coding near-end audio signals received from said microphone to provide coded near-end signals at an output of said speech coder;

a speaker for receiving far-end audio signals and for broadcasting corresponding far-end sound to a near-end user of said radio telephone;

a speech decoder coupled to said speaker for decoding coded far-end signals received at an input of said speech decoder to provide far-end audio signals to said speaker;

a radio transceiver for receiving coded far-end signals from, and transmitting coded near-end signals to, a radio communication network;

an external connection for receiving network-formatted far-end signals from, and transmitting network-formatted near-end signals to, a computer network;

a converter, said converter formatting, according to an Internet Protocol (IP), coded near-end signals to provide said network-formatted near-end signals and converting, according to an Internet Protocol (IP), said network-formatted far-end signals to provide coded far-end audio signals; and a digital interface for selectively coupling the output of said speech coder and the input of said speech decoder to one of said radio transceiver and said converter.

2. A radio telephone according to claim 1, wherein coded near-end signals and coded far-end signals are coded according to a GSM standard.

3. A radio telephone according to claim 1, wherein coded near-end signals and coded far-end signals are coded according to a D-AMPS standard.

4. A radio telephone according to claim 1, wherein said external connection is configured so that said radio telephone can be coupled to a desk-top computer.

5. A radio telephone according to claim 1, wherein said external connection is configured so that said radio telephone can be coupled to a lap-top/notebook computer.

6. A radio telephone according to claim 1, wherein said external connection is configured so that said radio telephone can be coupled to a palm-top computer.

7. A radio telephone according to claim 1, wherein said external connection comprises a connector for coupling said radio telephone to the computer using a cable.

8. A radio telephone according to claim 1, wherein said external connection comprises an infrared transceiver for coupling said radio telephone to the computer using infrared signals.

9. A radio telephone according to claim 1, wherein said external connection comprises a shortwave radio transceiver for coupling said radio telephone to the computer using shortwave radio signals.

10. A method for conducting telephony, comprising the steps of:

setting a mode of operation of a radio telephone as one of a mobile radio mode and a network protocol mode;

transmitting coded near-end audio signals from the radio telephone to a radio transceiver in a mobile radio communications system, and receiving coded far-end audio signals from the radio transceiver at the radio telephone, when the mode of operation of the radio telephone is set to the mobile radio mode; and, when the mode of operation of the radio telephone is set to the network protocol mode, performing the steps of:

transmitting the coded near-end audio signals from the radio telephone to a computer;

formatting the coded near-end audio signals within the computer, according to a computer network protocol, to provide network-formatted near-end signals;

transmitting the network-formatted near-end signals from the computer to a computer network, wherein the network-formatted near-end signals are delivered to a far-end node of the computer network;

receiving network-formatted far-end signals from the computer network at the computer, wherein the network-formatted far-end signals are delivered from the far-end node of the computer network;

converting the network-formatted far-end signals within the computer to provide coded far-end audio signals; and transmitting the coded far-end audio signals from the computer to the radio telephone.

11. A method according to claim 10, wherein coded near-end signals and coded far-end signals are coded according to a GSM standard.

12. A method according to claim 10, wherein coded near-end signals and coded far-end signals are coded according to a D-AMPS standard.

13. A method according to claim 10, wherein the computer is a desk-top computer.

14. A method according to claim 10, wherein the computer is a lap-top/notebook computer.

15. A method according to claim 10, wherein the computer is a palm-top computer.

16. A method according to claim 10, wherein signals are communicated between the radio telephone and the computer using a cable.

17. A method according to claim 10, wherein signals are communicated between the radio telephone and the computer using infrared signals.

18. A method according to claim 10, wherein signals are communicated between the radio telephone and the computer using shortwave radio signals.

19. A radio telephone, comprising:

a microphone for receiving near-end sound and for providing corresponding near-end audio signals;

a speech coder coupled to said microphone for coding near-end audio signals received from said microphone to provide coded near-end signals at an output of said speech coder;

a speaker for receiving far-end audio signals and for broadcasting corresponding far-end sound to a near-end user of said radio telephone;

a speech decoder coupled to said speaker for decoding coded far-end signals received at an input of said speech decoder to provide far-end audio signals to said speaker;

a radio transceiver for receiving coded far-end signals from, and transmitting coded near-end signals to, a radio communication network;

a first external connection for transmitting coded near-end signals to an external computer, for receiving network-formatted near-end signals from the external computer, for transmitting network-formatted far-end signals to the external computer, and for receiving coded far-end signals from the external computer;

a digital interface for selectively coupling the output of said speech coder and the input of said speech decoder to one of said radio transceiver and said first external connection; and a second external connection coupled to said digital interface for transmitting network-formatted near-end signals received from the external computer to a computer network and for receiving network-formatted far-end signals from the computer network for transmission to the external computer.

20. A radio telephone according to claim 19, wherein the computer network is an Internet.

21. A radio telephone according to claim 19, wherein the computer network is an Intranet.

22. A radio telephone according to claim 19, wherein said second external connection comprises a network interface for communicating with the computer network, wherein said network interface comprises a modem.

23. A radio telephone according to claim 19, wherein said second external connection comprises a network interface for communicating with the computer network, wherein said network interface comprises an ISDN connection.

24. A radio telephone according to claim 19, wherein said second external connection comprises a network interface for communicating with the computer network, wherein said network interface comprises a wireless transceiver.

25. A radio telephone according to claim 19, wherein said second external connection comprises a network interface for communicating with the computer network, wherein said network interface comprises an Ethernet connection.

26. A method for conducting telephony, comprising the steps of:

coding near-end audio signals in a radio telephone to provide coded near-end signals;

transmitting the coded near-end signals from the radio telephone to a computer;

formatting the coded near-end signals within the computer, according to a computer network protocol, to provide network-formatted near-end signals;

transmitting the network-formatted near-end signals from the computer to the radio telephone;

transmitting the network-formatted near-end signals from the radio telephone to a computer network, wherein the network-formatted near-end signals are delivered to a far-end node of the computer network;

receiving network-formatted far-end signals from the computer network at the radio telephone, wherein the network-formatted far-end signals are delivered from the far-end node of the computer network;

transmitting the network-formatted far-end signals from the radio telephone to the computer;

converting the network-formatted far-end signals within the computer to provide coded far-end signals;

transmitting the coded far-end signals from the computer to the radio telephone; and decoding the coded far-end signals in the radio telephone to provide far-end audio signals.

27. A method according to claim 26, wherein the computer network is an Internet.

28. A method according to claim 26, wherein the computer network is an Intranet.

29. A method according to claim 26, wherein signals are transferred between the radio telephone and the computer network via a network interface comprising a modem.

30. A method according to claim 26, wherein signals are communicated between the radio telephone and the computer network via a network interface comprising an ISDN line.

31. A method according to claim 26, wherein signals are communicated between the radio telephone and the computer network via a network interface comprising a wireless transceiver.

32. A method according to claim 26, wherein signals are communicated between the radio telephone and the computer network via a network interface comprising an Ethernet connection.

33. A method for conducting telephony using a radio telephone, wherein the radio telephone includes a radio transceiver for communicating with a radio communication network, comprising the steps of:

setting a mode of operation of the radio telephone as one of a mobile radio mode and a network protocol mode;

transmitting coded near-end audio signals from the radio telephone transceiver to the radio communication network, and receiving coded far-end audio signals from the radio communication network at the radio telephone, when the mode of operation of the radio telephone is set to the mobile radio mode; and, when the mode of operation of the radio telephone is set to the network protocol mode, performing the steps of:

formatting the coded near-end audio signals in the radio telephone, according to a computer network protocol, to provide network-formatted near-end signals;

transmitting the network-formatted near-end signals from the radio telephone to a computer network, wherein the network-formatted near-end signals are delivered to a far-end node of the computer network;

receiving network-formatted far-end signals from the computer network at the radio telephone, wherein the network-formatted far-end signals are delivered from the far-end node of the computer network; and converting the network-formatted far-end signals in the radio telephone to provide coded far-end audio signals.

34. A telephony system, comprising:

a radio telephone for coding audio input signals to form coded near-end signals and for decoding coded far-end signals to form audio output signals; and a computer coupled to said radio telephone for converting coded near-end signals received from said radio telephone into network-formatted near-end signals suitable for transmission to a computer network and for converting network-formatted far-end signals received from the computer network into coded far-end signals suitable for transmission to said radio telephone, said radio telephone including a radio transceiver for transmitting coded near-end signals to, and receiving coded far-end signals from, a radio communication network, an external connection for transmitting coded near-end signals to and receiving coded far-end signals from, said computer, and a digital interface for selectively transmitting coded near-end signals to one of said radio transceiver and said external connection and for selectively receiving coded far-end signals from one of said radio transceiver and said external connection.

35. A telephony system according to claim 34 wherein said radio telephone further comprises a second connection coupled to said digital interface for transmitting network-formatted near-end signals received from said computer via said external connection to the computer network and for receiving network-formatted far-end signals from the computer network for transmission to said computer via said external connection.

36. A radio telephone, comprising:

a radio transceiver for transmitting coded near-end signals to, and receiving coded far-end signals from, a radio communication network;

an external connection for transmitting network-formatted near-end signals to, and receiving network-formatted far-end signals from, an external network;

a network converter, said network converter formatting, according to an Internet Protocol (IP), the coded near-end signals to provide said network-formatted near-end signals and converting, according to an Internet Protocol (IP), said network-formatted far-end signals to provide coded far-end audio signals; and a digital interface for selectively transmitting near-end signals to one of said radio transceiver and said external connection and for selectively receiving far-end signals from one of said radio transceiver and said external connection.

37. A radio telephone according to claim 36 further comprising a second connection coupled to said digital interface for transmitting network-formatted near-end signals received from the computer via said external connection to a computer network and for receiving network-formatted far-end signals from the computer network for transmission to the computer via said external connection.

38. A radio telephone according to claim 37 wherein said second connection is configured to transmit and receive signals to and from an Internet.

39. A radio telephone according to claim 37 wherein said second connection is configured to transmit and receive signals to and from an Intranet.

* * * * *